US007948890B2

(12) United States Patent
Shieh et al.

(10) Patent No.: US 7,948,890 B2
(45) Date of Patent: May 24, 2011

(54) SYSTEM AND METHOD FOR PROVIDING A COMMUNICATION CHANNEL

(75) Inventors: Ce-Kuen Shieh, Hsin-Chu (TW); Wen-Shyang Hwang, Hsin-Chu (TW); Yun-Shuai Yu, Hsin-Chu (TW); Che-Shiun Ho, Hsin-Chu (TW); Ji-Feng Chiu, Hsin-Chu (TW); Hsian-An Chang, Hsin-Chu (TW)

(73) Assignee: Industrial Technology Research Institute, Hsinchu (TW)

( * ) Notice: Subject to any disclaimer, the term of this patent is extended or adjusted under 35 U.S.C. 154(b) by 1635 days.

(21) Appl. No.: 11/012,373

(22) Filed: Dec. 14, 2004

(65) Prior Publication Data

US 2006/0126596 A1 Jun. 15, 2006

(51) Int. Cl.
*H04L 12/28* (2006.01)
*H04L 12/66* (2006.01)

(52) U.S. Cl. ........ 370/235; 370/248; 370/356; 370/392; 370/401

(58) Field of Classification Search .................. None
See application file for complete search history.

(56) References Cited

U.S. PATENT DOCUMENTS

| | | | |
|---|---|---|---|
| 6,731,624 B1 | 5/2004 | Maekawa et al. | |
| 2002/0141384 A1 | 10/2002 | Liu et al. | |
| 2004/0095937 A1 | 5/2004 | Piche et al. | |
| 2004/0139228 A1* | 7/2004 | Takeda et al. | 709/245 |
| 2004/0139230 A1 | 7/2004 | Kim | |
| 2005/0100001 A1* | 5/2005 | Liu | 370/352 |

FOREIGN PATENT DOCUMENTS

| | | |
|---|---|---|
| WO | WO 03/003697 A1 | 1/2003 |
| WO | WO 03/069493 A1 | 8/2003 |
| WO | WO 2004043046 A1 * | 5/2004 |

OTHER PUBLICATIONS

Yu, et al., "An Efficient NAT Traversal SIP and It's Associated Media Sessions", Computer & Communication Research Laboratories, Industrial Technology Research Institute, Taiwan, R.O.C. http://ics2004.ttu.edu.tw (Dec. 14, 2004).
Rosenberg, et al., "Examples of Network Address Translation (NAT) and Firewall Traversal For the Session Initiation Protocol (SIP)," The Internet Society (2004), http://www.ietf.org/ietf/1id-abstracts.txt.
Rosenberg, et al., "STUN-Simple Traversal of User Datagram Protocol (UDP) Through Network Address Translators (NATS)," The Internet Society (2003).
Rosenberg, et al., "Traversal Using Relay NAT (TURN)," The Internet Society (2004), http://www.ietf.org/ietf/1id-abstracts.txt.

* cited by examiner

*Primary Examiner* — Melanie Jagannathan
(74) *Attorney, Agent, or Firm* — Alston & Bird LLP

(57) ABSTRACT

Communication devices and methods are proposed for providing communication channel. In one example, devices and methods are capable of reaching one or more terminals that are not in a public network. In addition, depending on the network or the networks that the terminals are located, some examples may be capable of establishing a less indirect or a direct communication channel between two terminals after they communicate through an intermediate system. In another example, a triggering packet may be sent to provide a binding at an interface of a private network, such as an NAT, thereby reducing or eliminating communication through a relay server.

25 Claims, 8 Drawing Sheets

SYSTEM AND METHOD FOR PROVIDING A COMMUNICATION CHANNEL

FIELD

The present invention relates generally to network communication devices and methods, and more specifically, to devices and methods for providing a communication channel between two terminals.

BACKGROUND

A communication network, such as the Internet or a local area network (LAN), allows the exchange of data between two or more terminals. In recent years, the development of high-speed or broadband networks has facilitated the exchange of data at higher rates, thereby making real-time or nearly real-time communication through a communication network an effective mode of communication. For example, two terminals accessible to a common network not only may exchange non-real-time data such as e-mails, but also may communicate via voice or even video and exchange other types of data in real time.

For example, one of the popular forms of such communication includes voice over internet-protocol (VoIP). Due to its low cost and broad applications, VoIP has become more and more popular. VoIP allows the users of two terminals, such as computers or network-compatible phones, to communicate via a data network or Internet without relying on the traditional landlines.

For two terminals to exchange data, including real-time data, the two terminals can locate each other and communicate directly or indirectly through a third party. For example, two terminals in a public network can locate each other if both of them are properly registered with the Internet-protocol ("IP") addresses. However, for security reasons, some terminals may be hidden from a public network and cannot be reached with its IP address alone. For example, a terminal may communicate through a network address translator ("NAT") or another medium of similar effect. As a result, the terminal may not be identifiable by its IP address from the packets being sent from the terminal because the IP address has been masked. To allow efficient exchange of voice and other types of data between two terminals, there is a need for improved devices or methods for providing a communication channel between two or more terminals.

SUMMARY

An aspect of the invention includes a communication system having a first terminal, a second terminal, and an intermediate system configured to allow initial signal exchange and to establish a first communication channel between the first terminal and the second terminal through the intermediate system. In particular, the first terminal is in a private network, which is coupled to a public network. The second terminal and the intermediate system are also coupled to the public network. When the second terminal is in the public network, an allocation of a binding at an interface of the private network may be requested. The first terminal is configured to notify the second terminal of the binding through a first communication channel. Both the first terminal and the second terminal are configured to establish a second communication channel through the binding without going through the intermediate system.

Another aspect of the invention includes a system for providing a binding address. The system includes an interface for media access control and a processor. The interface is coupled to a network, and the processor is coupled to the network through the interface. In particular, the processor is configured to provide a relay address to a first terminal and to maintain a port for communicating with the first terminal. The first terminal is in a private network and the port is maintained at an interface of the private network.

Another aspect of the invention provides a method of establishing a communication channel between a first terminal and a second terminal. The method includes forming a first communication channel between the first terminal and the second terminal through an intermediate system. In particular, when the first terminal is in a private network, the method further includes: sending a trigger packet from the first terminal, with the trigger packet being configured to trigger an allocation of a binding at an interface of the private network; notifying the second terminal of the binding; and establishing a second communication channel through the binding.

Another aspect of the invention includes a method of providing a communication channel. The method comprises: receiving an address request from a first terminal to a server, with the address request being configured to request a relay address through a first port; providing the relay address allocated to a second port at the server if the address request comes through a network address translator; and maintaining the first port for the server to communicate with the first terminal.

DETAILED DESCRIPTION OF THE INVENTION

Examples illustrated below relate to network communications. In one example, devices and methods are capable of reaching one or more terminals that are not in a public network. For example, the devices and methods may be capable of reaching one or more terminals communicated through an NAT or a device of similar effect. In another example, an intermediate system may provide a port at the server for relaying communication requests and maintain a port at an NAT for the server to reach a terminal behind the NAT. In addition, depending on the network or the networks that the terminals are located, some examples may be capable of establishing a direct communication channel between two terminals after they communicate through an intermediate system, thereby allowing exchange of voice or other types of data. In another example, a triggering packet may be sent to provide a binding at an interface of a private network, such as an NAT, thereby reducing or eliminating communication through a relay server.

Certain examples illustrated below are described in conjunction with certain protocols, such as the session initiation protocol ("SIP"), capable of initiating a session to provide a communication channel for the exchange of voice, video, or other types of data. However, it is noted that such examples may be implemented with other protocols.

The session initiation protocol (SIP), a protocol drafted by the Internet Engineering Task Force (IETF) is a signal protocol for establishing communication sessions or a communication channel in a network, such as an Internet-protocol-based network. As an example, the session initiated may be a telephone call involving two or more parties or a videoconference involving two or more parties, including a multimedia conference. Recently, SIP has become a popular protocol for voice and multimedia communication.

Figure 1A:
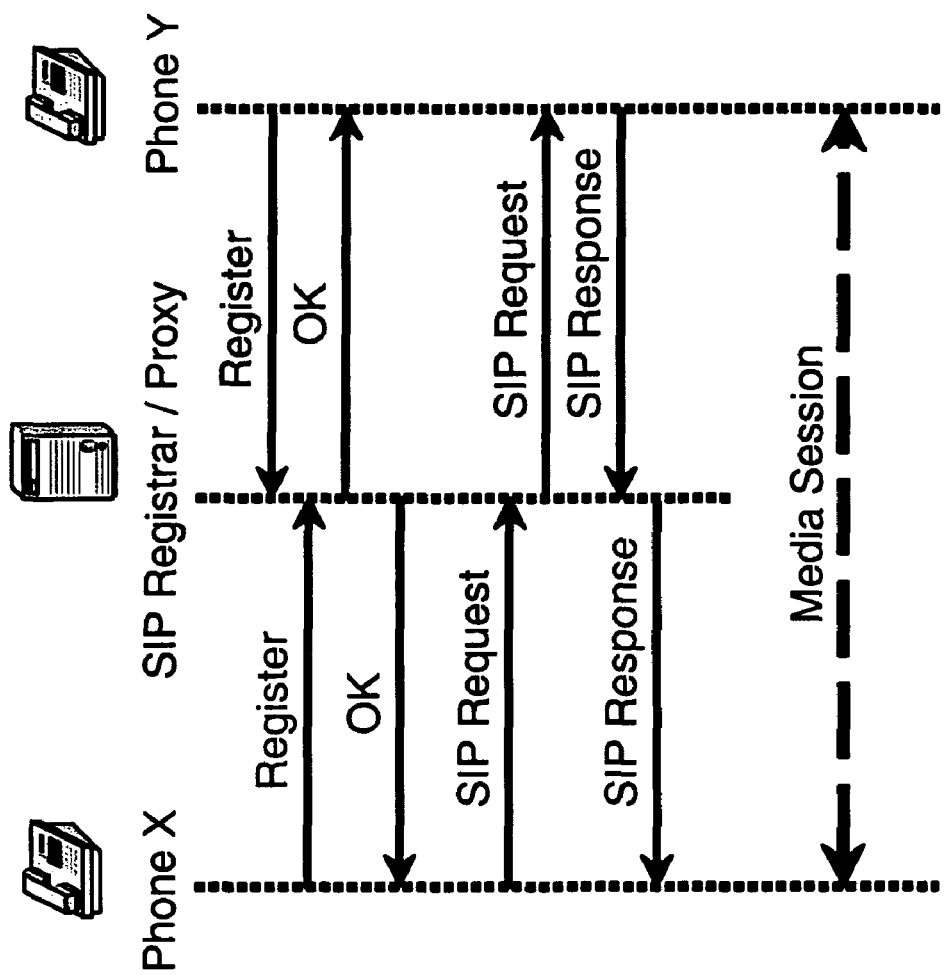
FIG. 1a is a schematic diagram showing the communication between two terminals via an SIP registrar or proxy in one example.

A communication protocol, such as SIP, allows the two terminals in a network to locate each other and establish a communication channel. For example, FIG. 1a is a schematic diagram showing the communication between two terminals, or two phone devices in this case, via an SIP registrar or proxy. As shown in FIG. 1a, when both terminals are properly registered with a SIP registrar or proxy, SIP requests and responses can be exchanged between the two terminals to establish a media communication session that allows the exchange of voice, video, and other data between the two terminals.

Figure 1B:
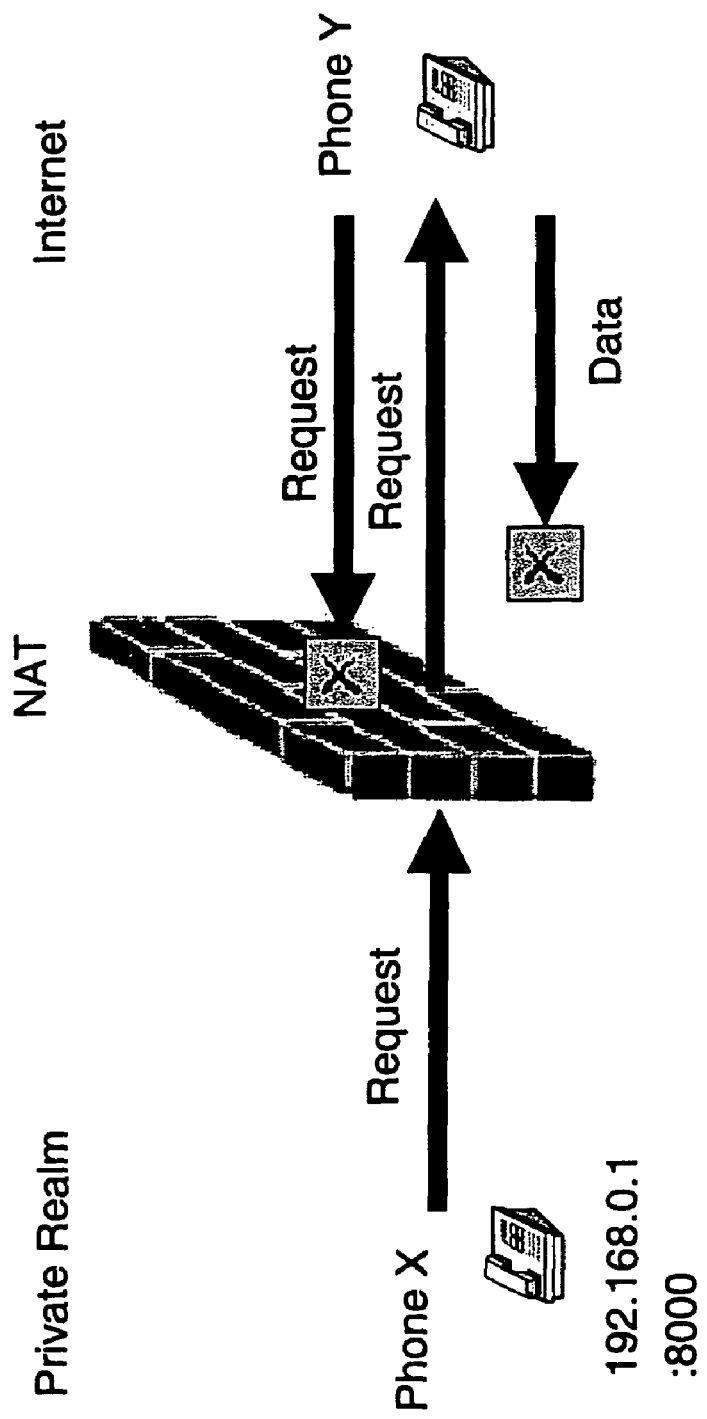
FIG. 1b is a schematic diagram illustrating the effect of an NAT on communications in one example.

However, this approach cannot reach non-public terminals, such as a terminal behind a private network, including a terminal communicating through an NAT. FIG. 1b is a schematic diagram illustrating the effect of an NAT on communications. Referring to FIG. 1b, a communication request from Phone Y or some other terminals may be blocked by NAT, which may block certain or most of the public network access for security reasons. Although Phone X may send a communication request through the NAT to Phone Y, the data sent by Phone Y may also be blocked by NAT. Generally, the reason causing such data blocking is because that the address where Phone X transmits its communication request is different from where Phone X can receive data, including multimedia data. Therefore, although the request from Phone X may trigger an address binding that allows the response from Phone Y to be transmitted, the binding is not capable of allowing data transmission from Phone Y. Due to the widespreading use of NATs and these limitations of NATs, providing SIP or other protocols with the capability to work with NATs has been a popular research topic.

One approach of allowing a through-NAT communication is to rely on a third terminal to be responsible for receiving and forwarding all communication requests and communication packets. For example, a TURN (Traversal Using Relay NAT) server, which serves as a relay server, may be used to allow a terminal behind an NAT to receive data from the network. A third terminal, such as a trigger-address-binding server, may receive, respond to, and/or forward to appropriate terminals the responses occurred after a communication request is sent to a terminal in a private network. In addition, under certain conditions, a trigger-address-binding ("TAB") server need not to forward certain media traffic. In contrast, a TURN server usually forwards all media traffic.

In one example, a system may be provided with an address binding design or a triggering address binding design and a method of establishing a communication channel through the user of an intermediate system, such as a TAB server. The following system is described using an SIP-compliant device. Other compliant devices may also be used such as, e.g., H.323, Megaco, and MGCP.

Figure 2:
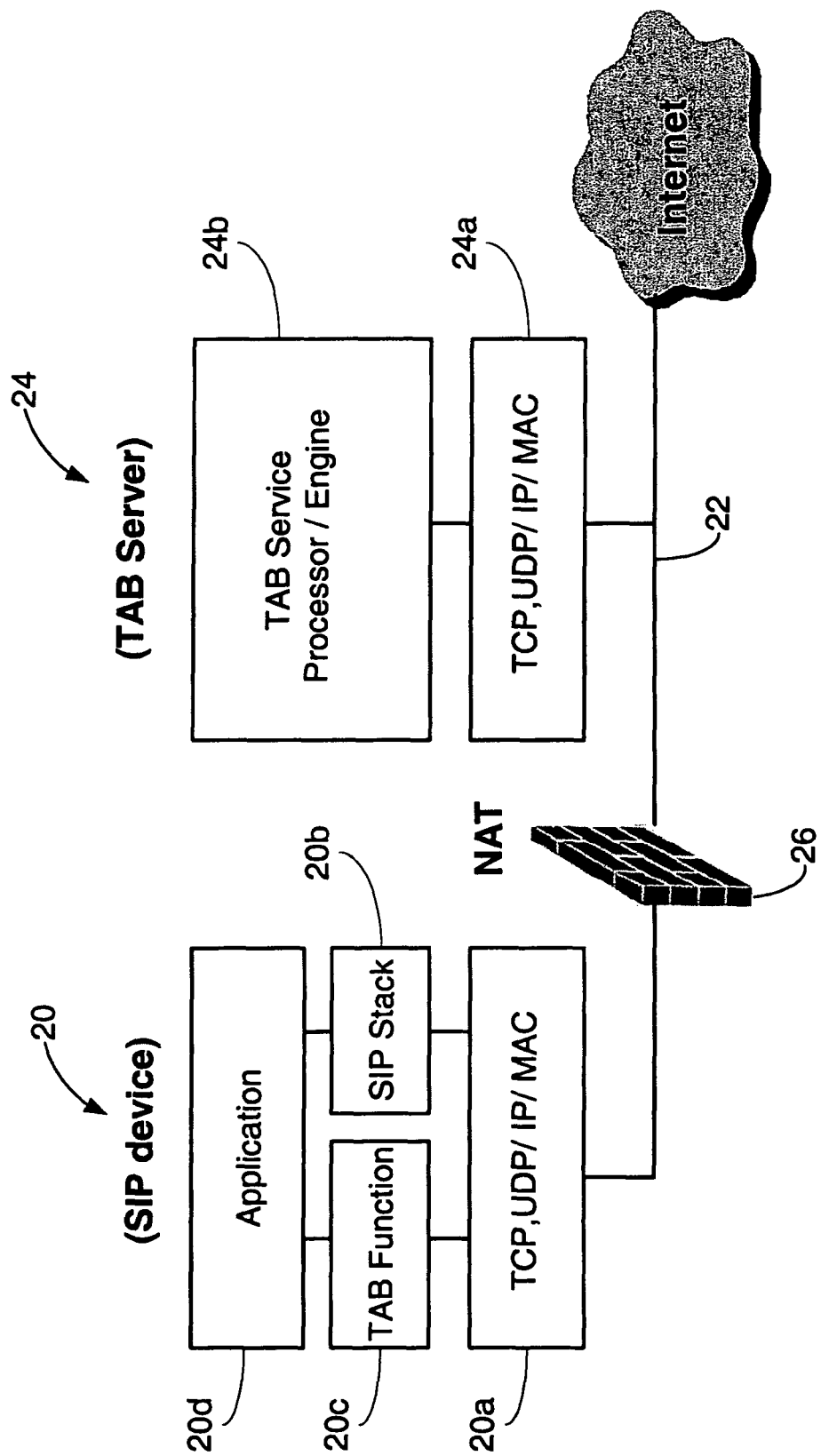
FIG. 2 shows a schematic block diagram of a trigger-address-binding (TAB) system in one example.

FIG. 2 shows a schematic block diagram of a TAB system. Referring to FIG. 2, a terminal 20 capable of communicating under SIP may include TCP, UDP/IP/MAC (Transmission Control Protocol, User Datagram Protocol/Internet Protocol/Media Access Control) block 20a, SIP Stack block 20b, TAB Function block 20c, and Application block 20d. The TCP, UDP/IP/MAC block 20a may serve as an interface for communicating through a network 22, such as the Internet. The TCP, UDP/IP/MAC block 20a may be coupled with the SIP stack block 20b and the TAB Function block 20c, both of which may be coupled with the Application block 20d.

In addition, an intermediate system, such as TAB Server 24, may be coupled with terminal 20, through a network connection 22, either directly or through an interface of a private network, such as an NAT 26. Network connection 22 may include the Internet, and, if NAT 26 is present, a portion of a private network. In one example, TAB Server 24 may include TCP, UDP/IP/MAC block 24a and TAB Service Processor (or Engine) 24b. We will discuss below exemplary operations for establishing a communication channel between two terminals.

Figure 3:
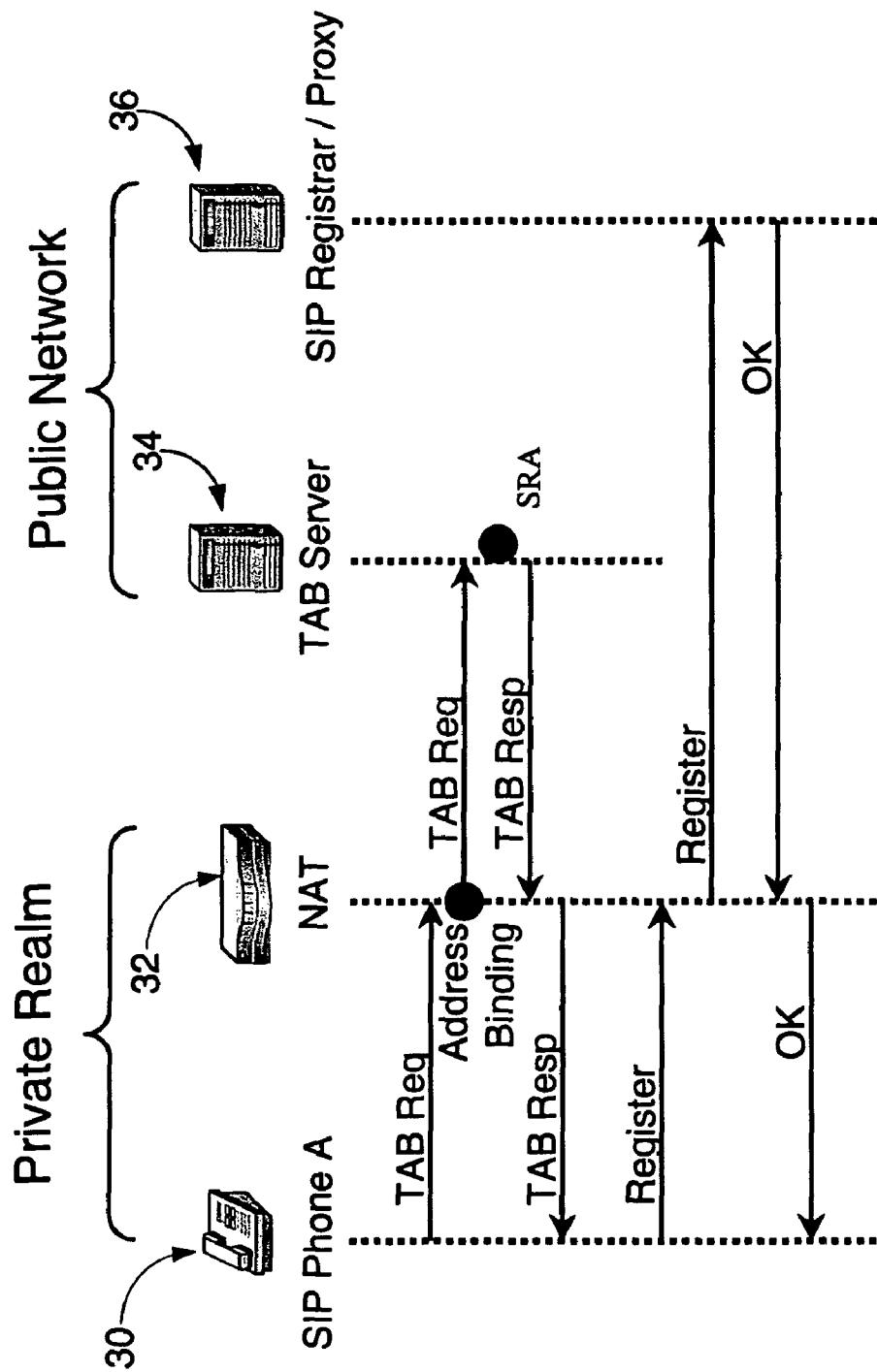
FIG. 3 illustrates an exemplary message flow of a system during registration and the allocation of an SIP relay address in one example.

FIG. 3 illustrates an exemplary message flow of a system during registration. Referring to FIG. 3, the system may include first terminal 30, NAT 32, an intermediate system such as TAB server 34, and SIP registrar or proxy 36. In one example, first terminal 30 may be a computer terminal or a network phone that is SIP compatible, such as SIP phone A shown in FIG. 3. First terminal 30 may use some or all of the terminal designs illustrated above, such as that of terminal 20 shown in FIG. 2. Alternatively, TAB server 34 may use some or all of the TAB server designs illustrated above, such as that of TAB server 24 shown in FIG. 2.

Referring to FIG. 3, first terminal 30 may send an address request or TAB request, which may go through a port provided by an interface of a private network, such as a port at NAT 32, to TAB server 34 to request a relay address. The TAB request may be issued from a TAB function block at first terminal 30, such as TAB function block 20c shown in FIG. 2. For example, first terminal 30 may be configured to issue such TAB request using UDP (User Datagram Protocol) before first terminal 30 issues an SIP register message. The address used for issuing the TAB request may be the location where first terminal 30 will be used to receive SIP messages. This address can also be the IP address of first terminal 30 with port 5060 added to that address.

If the TAB request from first terminal 30 is identified as coming out of a private network, such as through NAT 32, TAB server 34 may provide a relay address, such as a public transport address SRA (SIP relay address) that is specifically designated for first terminal 30. The public transport address SRA can be a port provided at TAB server 34 for first terminal 30. Because first terminal 30 is in a private network and cannot be directly identified or reached at a public network, the port provided at TAB server 34 provides a mechanism to reach first terminal 30 when another terminal seeks to establish a communication channel with first terminal 30.

The identification of whether a TAB request comes from a public or private network terminal may be done at TAB server 34. Generally, first terminal 30 may include its IP address in the application layer. Accordingly, exemplary operations of the TAB server 34 can include conducting the identification by comparing the IP header with the UDP header and the contents in the application layer of the packet from first terminal 30. If the addresses are identical, TAB server 34 may notify the requesting terminal that the terminal is in a public network. Otherwise, TAB server 34 may provide a relay address for the terminal as noted above.

After receiving the response from TAB server 34, first terminal 30 may register the relay address provided by TAB server 34 with a registration terminal, such as SIP registrar or proxy 36. SIP registrar or proxy 36 may respond to confirm that the relay address associated with first terminal 30 has been properly registered. For a terminal in a public network, the terminal may register its own address with SIP registrar or proxy 36, without relying on a relay address from TAB server 34.

Figure 4:
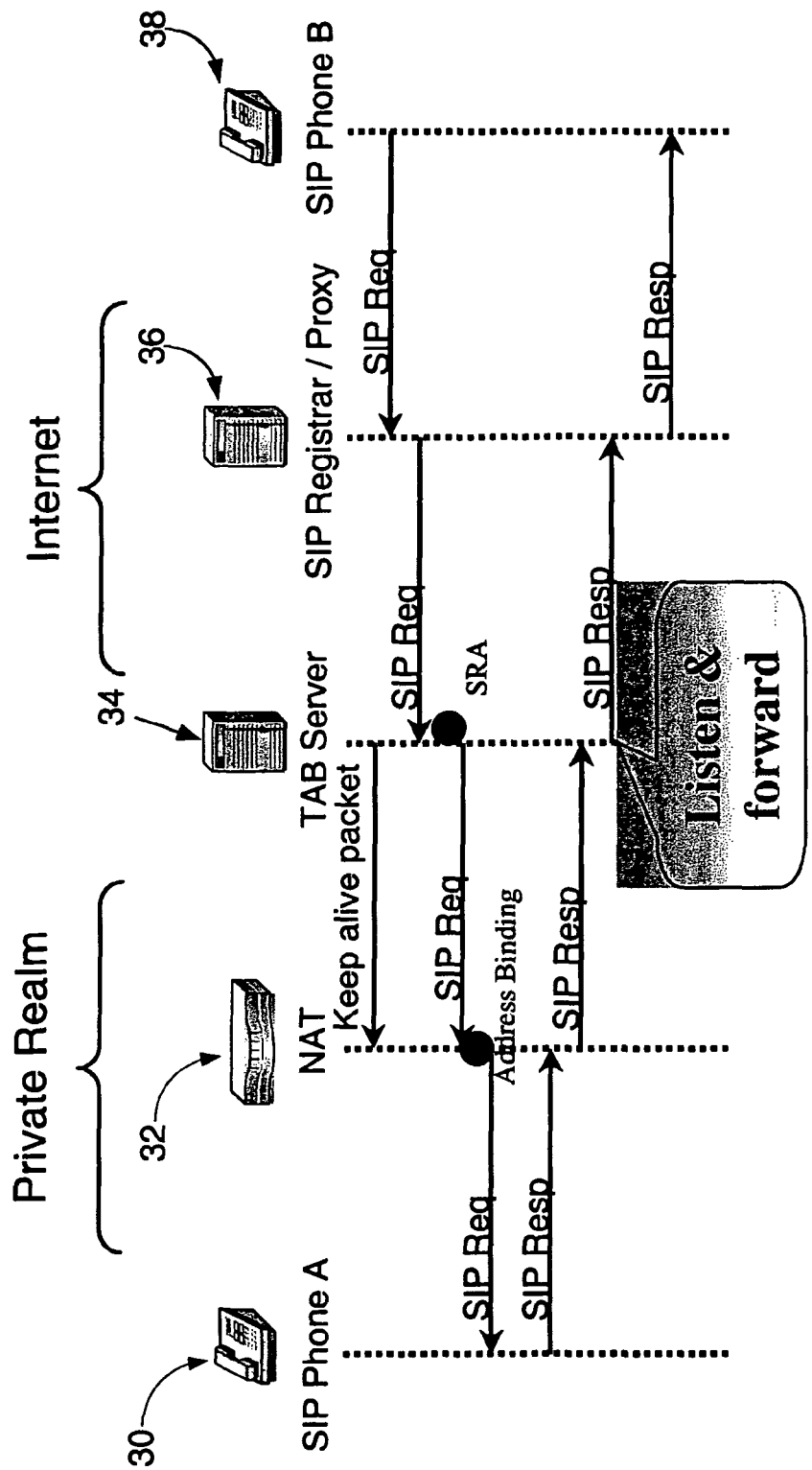
FIG. 4 illustrates another exemplary message flow of a system during initial signal exchange in one example.

In one example, first terminal 30 is in a private network. To maintain the ability to contact first terminal 30, TAB server 34 may need to maintain the port, or the address binding, provided at NAT 32, to enable TAB server 34 to communicate with first terminal 30. For example, TAB server 34 may maintain the NAT port by periodically sending packets through the NAT port to keep the port "alive" and prevent NAT 32 from closing the port after a period of non-communication. An example of sending a "keep alive" packet is illustrated in FIG. 4. In one example, such "keep alive" packet may include a CrLf symbol.

FIG. 4 illustrates another exemplary message flow of a system during a communication process in one example. The system may include first terminal 30, NAT 32, TAB server 34, SIP registrar or proxy 36, and second terminal 38. Examples of second terminal 38 include a computer terminal or a phone that is SIP compatible, such as SIP phone B shown in FIG. 4. When second terminal 38 seeks to communicate with a terminal located in a private network, such as first terminal 30, second terminal 38 may send out a communication request, such as an SIP request. After initial exchange of signals during an SIP session, a session for exchange of voice, data, images, or any combination of them may be initiated.

Referring to FIG. 4, the communication request from second terminal 38, which is shown as an SIP request in FIG. 4, may go through SIP registrar or proxy 36, which may identify the registered address, port, or relay address corresponding to first terminal 30. For example, SIP registrar or proxy 36 may, according to the earlier registration of first terminal, identify and provide the relay address at TAB server 34. Therefore, the communication request may be directed to TAB server 34, which maintains the NAT port to reach first terminal 30 behind a private network. TAB server 34 may be instructed or designed to forward the communication request, such as the SIP request shown in FIG. 4. Accordingly, bi-directional monitoring/listening and forwarding functionalities may be achieved. For example, TAB server 34 may be a "listening and forwarding" server as shown in FIG. 4, such that communication requests, responses, or other messages going one way or the other can always be forwarded. In contrast, conventional TURN servers only relay the requests into the private network. In addition, the responses come from the private network usually are discarded by TURN servers.

First terminal 30 may then be notified of the communication request, which may be sent to first terminal 30 through the port or address binding provided at NAT 32 and maintained by TAB server 34. In one example, after first terminal 30 responds to the request from second terminal 38 through NAT 32, TAB server 34, and SIP registrar or proxy 36, an SIP session may be initiated. In other words, a communication channel between first terminal 30 and second terminal 38 may be established through TAB server 34.

Figure 5:
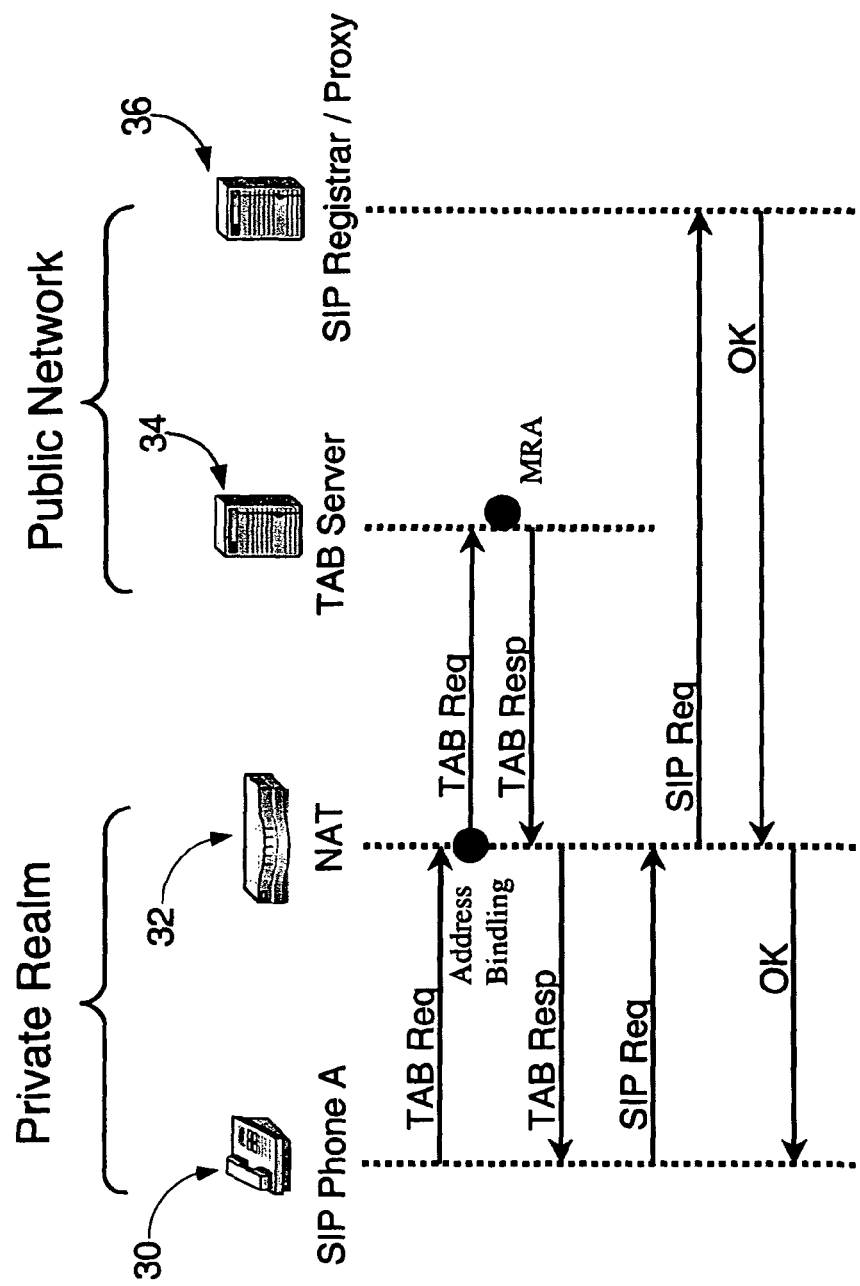
FIG. 5 is an exemplary message flow diagram illustrating the allocation of a media relay address in one example.

There are several ways to establish a communication channel between two terminals. For example, a media relay address or a designated port may be provided at TAB server 34 for facilitating the exchange of information between two terminals. FIG. 5 is a schematic message flow diagram illustrating the allocation of a media relay address ("MRA") in one example. Referring to FIG. 5, first terminal 30 may send TAB server 34 an MRA request to request the allocation of an MRA. In response, TAB server 34 may provide an MRA allocated to a port (for media relay) at TAB server 34 if the MRA request comes through a private network or NAT 32. TAB server 34 may notify first terminal 30, through NAT 32, of the MRA assigned. Other parties, such as second terminal 38, may also be notified of the MRA upon establishing the first communication channel. TAB server 34, which may periodically send packets through the port, similarly may maintain the port or address binding at NAT 32. In one example, the MRA information may be provided to second terminal 38 by the response from first terminal 30, which may include MRA information in an SIP response message.

First terminal 30 can notify another party, such as second terminal 38, of a specific MRA to be used by sending an SIP/SDP message. For example, an exemplary SIP/SDP message includes:

v=0
o=jack 2691444900 2487311000 IN IP4 host.TAB.com
s=test
c=IN IP4 140.116.72.98
m=audio 32354 RTP/AVP 0
t=0 0
a=local_addr:192.168.0.1 1200

Referring to the above message, the fourth and fifth lines ("c=IN IP4 . . . " and "m=audio 32354 . . . ") may be used to identify the MRA. And the last line ("a=local_addr: . . . ") may be one of the customized fields, which in this example contains the local address of first terminal 30. Therefore, with the exchange of SIP messages, two terminals communicating with each other may be able to identify whether the other terminal is in a public network or behind a private network (or an NAT). After exchanging SIP messages, if both of the terminals are in a public network, the two terminals may establish a direct communication channel between each other to exchange voice, image, or data.

Figure 6:
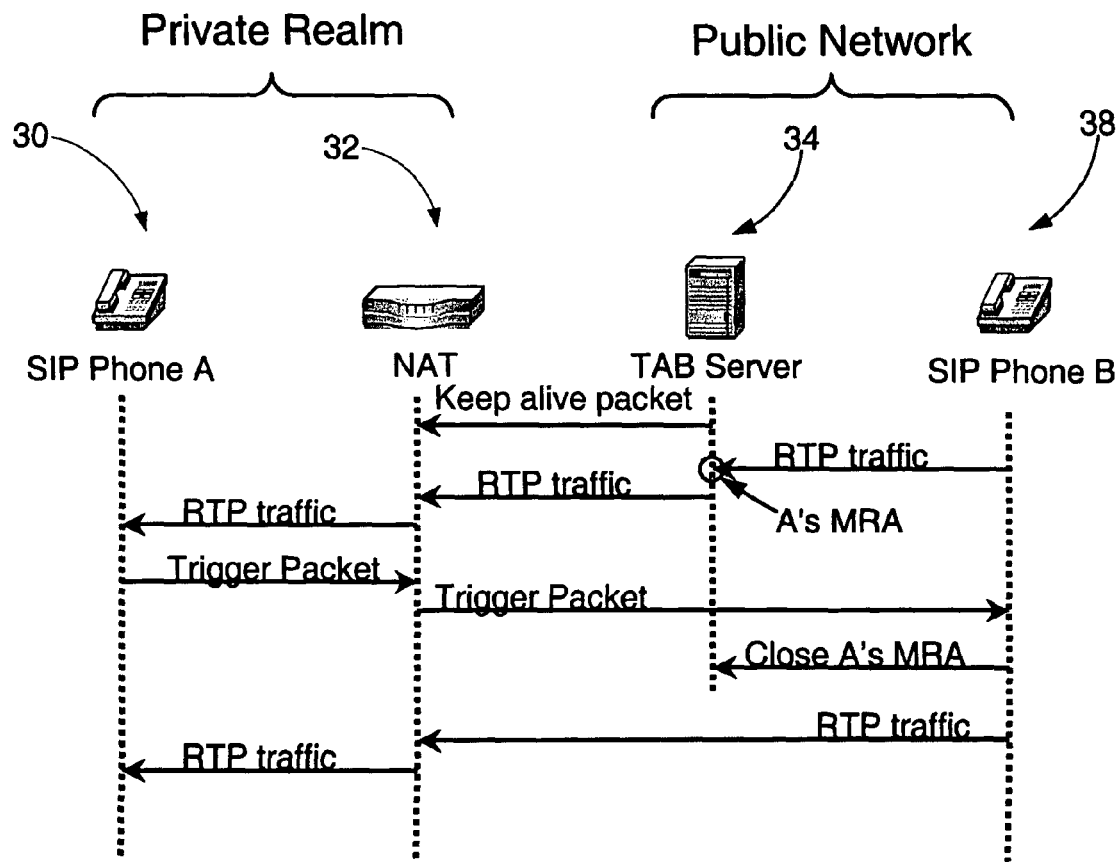
FIG. 6 is an exemplary message flow diagram illustrating the use of a trigger packet in one example.

If one of first terminal 30 and second terminal 38 is in a private network, alternative or additional process may be used to establish a more direct communication channel. For example, after an initial signal exchange between two terminals, a trigger packet may be used to generate an NAT binding. FIG. 6 is a schematic message flow diagram illustrating the use of a trigger packet in one example. Referring to FIG. 6, first terminal 30 may send out a trigger packet through NAT 32 to second terminal 38. The trigger packet can be configured to trigger the allocation of a binding, or a binding port, at NAT 32. With the trigger packet, second terminal 38 may be notified of the binding and may direct real-time-protocol ("RTP") traffic to the binding without going through TAB server 34. In other words, the binding may provide a more direct communication channel between two terminals. In addition, if an MRA is used through a port provided at TAB server 34, the port may be closed after the communication channel through the binding is established.

Figure 7:
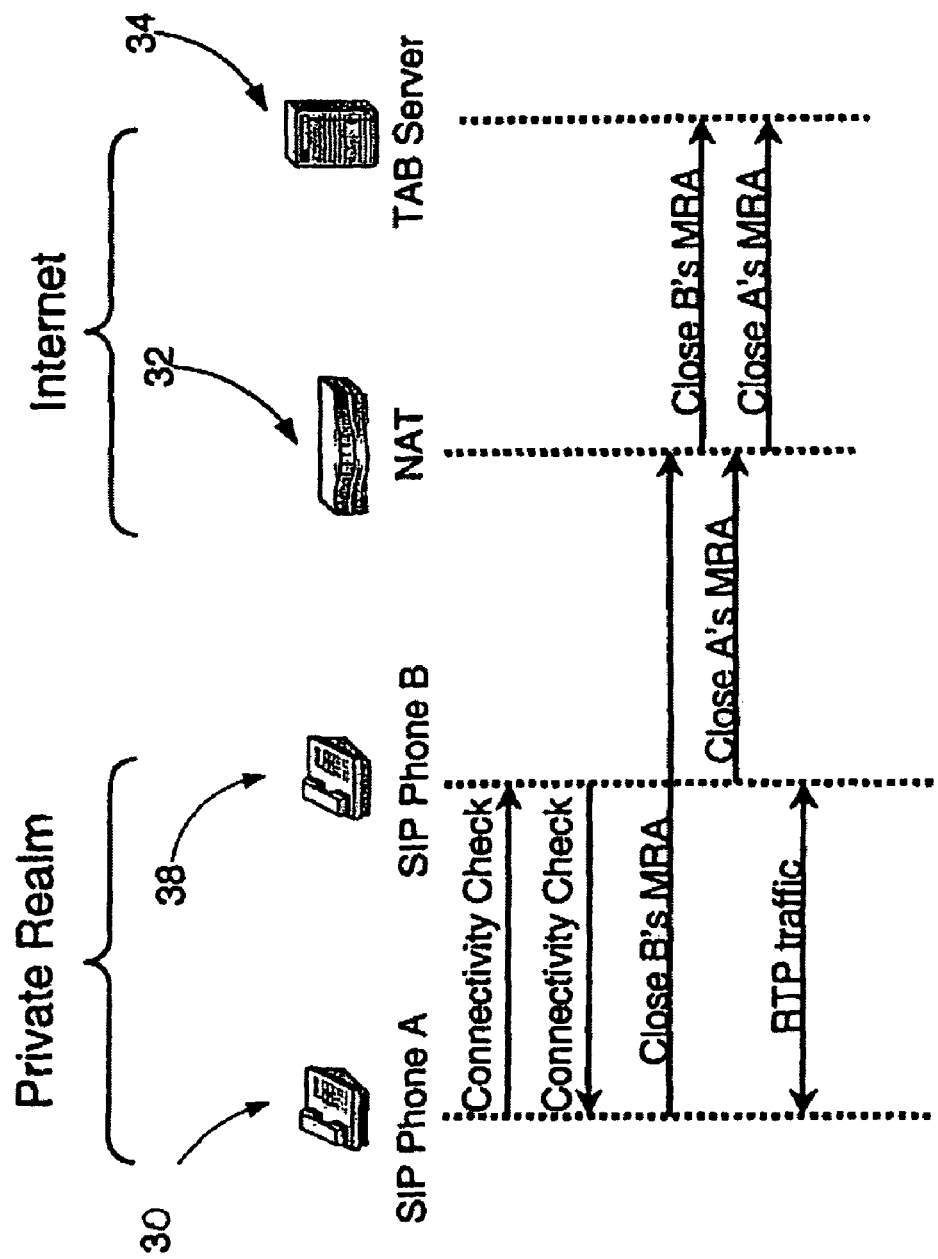
FIG. 7 is an exemplary message diagram illustrating a connectivity checking process in one example.

Other examples may use a connectivity check. For example, if first terminal 30 and second terminal 38 are both in the same private network, a direct communication channel may be established using a connectivity check. FIG. 7 is a schematic message diagram illustrating a connectivity checking process in one example. Referring to FIG. 7, after exchanging SIP messages, each of the two terminals may be identified as being in a private network. First terminal 30 may send out a connectivity check packet to second terminal 38.

The connectivity check packet may be configured to identify if first terminal 30 and second terminal 38 are both in the same private network.

For example, a connectivity check packet may be a UDP packet sent to second terminal 38's local address, which may be identified from its SIP/SDP message. If second terminal 38 can be reached via its local address, it means that both terminals are in the same private network. As a result, a direct communication channel may be established between first terminal 32 and second terminal 38 without going through NAT 32 and the ports it provided to the two terminals. After the direct communication channel is established, the MRAs corresponding to the two terminals may be closed.

The above examples illustrate devices and methods of establishing a communication channel, such as an SIP session for voice exchange. To ensure the security of communications, TAB requests, responses to TAB requests, trigger packets, and connectivity check packets as described above may be encrypted by various encryption approaches, including encrypting with certificates. In addition, it should be noted that modifications can be made to these examples. Furthermore, the sequence of steps illustrated above may also be modified, and the particular order of the steps set forth in the specification or the figures should not be construed as limitations on the claims.

The foregoing disclosure has been presented for purposes of illustration and description. It is not intended to be exhaustive or to limit the invention to the precise examples disclosed. As noted above, many variations and modifications to the described examples can be made. The scope of the invention is to be defined only by the claims appended hereto and by their equivalents.

What is claimed is:

1. An apparatus comprising a processor configured to perform or cause the apparatus to perform at least the following:
   receiving a first relay address request message from a first terminal in a private network, the first relay address request message being received through a first binding address at an interface of the private network, the first relay address request message requesting a first relay address designated for the first terminal;
   providing in response to the first relay address request message, the first relay address for establishing a first communication channel between the first terminal and a second terminal, the first communication channel extending through the apparatus such that the apparatus relays control signals transmitted in the first communication channel between the first terminal and the second terminal;
   providing a second relay address designated for the first terminal to establish a second communication channel between the first terminal and the second terminal, the second communication channel extending through the apparatus such that the apparatus relays real-time traffic transmitted in the second communication channel from the second terminal to the first terminal; and
   closing the second communication channel in response to an indication of establishment of a third communication channel between the first terminal and the second terminal, the third communication channel being independent of the apparatus such that the apparatus does not relay the real-time traffic transmitted in the third communication channel between the first terminal and the second terminal.

2. The apparatus of claim 1, the processor is further configured to perform or cause the apparatus to perform:
   receiving a communication request from the second terminal at the first relay address;
   preparing the communication request for transmission to the first terminal through the first binding address; and
   receiving a communication response from the first terminal in response to the communication request to establish the first communication channel between the first terminal and the second terminal.

3. The apparatus of claim 1 wherein the processor is further configured to perform or cause the apparatus to perform:
   receiving a second relay address request message from the first terminal, the second relay address request message requesting the second relay address designated for relaying the real-time traffic from the second terminal to the first terminal,
   the second relay address being provided in response to the second relay address request message.

4. The apparatus of claim 1, wherein the processor is further configured to perform or cause the apparatus to perform:
   relaying real-time traffic transmitted in the second communication channel from the second terminal to the first terminal through the second relay address,
   wherein the real-time traffic transmitted in at least one of the second communication channel or third communication channel comprises at least one of an audio stream or a video stream.

5. The apparatus of claim 1, wherein the processor is further configured to perform or cause the apparatus to perform:
   relaying control signals transmitted in the first communication channel between the first terminal and the second terminal through the first relay address, wherein the control signals comprise at least one of a request message or a response message.

6. The apparatus of claim 1, wherein closing the second communication channel includes closing the second communication channel in response to an indication of establishment of a third communication channel between the first terminal and the second terminal in an instance in which the second terminal is identified to be in the same private network as the first terminal by transmission of connectivity check packets therebetween.

7. The apparatus of claim 1, wherein when the second terminal is identified to be in the public network by transmission of a trigger packet from the first terminal to the second terminal, establishing the third communication channel includes transmission of a trigger packet to the second terminal, the trigger packet being configured to trigger a second binding address at the interface of the private network for establishing the third communication channel between the first terminal and the second terminal.

8. An apparatus operable in a private network and couplable with a public network, wherein the apparatus comprises a processor configured to perform or cause the apparatus to perform at least the following:
   sending a first relay address request message to an intermediate system, the first relay address request message being sent through a first binding address at an interface of the private network, the first relay address request message requesting that the intermediate system provide a first relay address designated for the apparatus;
   receiving in response to the first relay address request message, the first relay address for establishing a first communication channel between the apparatus and a second apparatus through the intermediate system;

receiving control signals from the second apparatus, through the first relay address and in the first communication channel such that the intermediate system relays the control signals between the apparatus and the second apparatus;

establishing a second communication channel between the apparatus and the second apparatus, and independent of the intermediate system; and transmitting real-time traffic to the second apparatus, and receiving real-time traffic from the second apparatus, in the second communication channel such that the intermediate system does not relay the real-time traffic between the apparatus and the second apparatus.

9. The apparatus of claim 8, wherein the processor is further configured to perform or cause the apparatus to perform:

sending a second relay address request message to the intermediate system, the second relay address request message being sent through the interface of the private network, the second relay address request message requesting that the intermediate system provide a second relay address designated for the apparatus;

receiving the second relay address to establish another communication channel between the apparatus and the second apparatus through the intermediate system before the second communication channel is established;

receiving real-time traffic from the second apparatus, in the other communication channel such that the intermediate system relays the real-time traffic from the second apparatus to the apparatus.

10. The apparatus of claim 8, wherein establishing the second communication channel includes transmission of a trigger packet to the second apparatus, the trigger packet being configured to trigger a second binding address at the interface of the private network for establishing the second communication channel between the apparatus and the second apparatus.

11. The apparatus of claim 9, wherein the second communication channel is established after establishment of the other communication channel, and wherein the processor is further configured to perform or cause the apparatus to perform:

notifying the intermediate system to close the other communication channel after establishment of the second communication channel.

12. The apparatus of claim 8, wherein establishing the second communication channel includes transmission of at least two connectivity check packets between the apparatus and the second apparatus to enable a direct communication therebetween in an instance in which the second terminal is identified to be in the same private network as the first terminal.

13. A method of establishing a communication channel between a first terminal in a private network and a second terminal, the method comprising:

receiving a first relay address request message from the first terminal in the private network, the first relay address request message being received through a first binding address at an interface of the private network, the first relay address request message requesting a first relay address designated for the first terminal;

providing in response to the first relay address request message, the first relay address for establishing a first communication channel between the first terminal and a second terminal, the first communication channel extending through the apparatus such that the apparatus relays control signals transmitted in the first communication channel between the first terminal and the second terminal;

providing a second relay address for establishing a second communication channel between the first terminal and the second terminal such that the apparatus relays real-time traffic transmitted from the second terminal to the first terminal in the second communication channel; and closing the second communication channel in response to an indication of establishment of a third communication channel between the first terminal and the second terminal, the third communication channel being independent of the apparatus such that the apparatus does not relay the real-time traffic transmitted in the third communication channel between the first terminal and the second terminal.

14. The method of claim 13, further comprising:

maintaining the first binding address, including periodically sending a packet to the interface of the private network based on the first binding address, to enable the communication between the first terminal and the apparatus.

15. The method of claim 13, further comprising:

receiving a communication request from the second terminal at the first relay address;

preparing the communication request for transmission to the first terminal through the first binding address; and receiving a communication response message from the first terminal in response to the communication request to establish the first communication channel from the first terminal to the second terminal.

16. The method of claim 13, further comprising:

receiving through the interface of the private network a second relay address request message from the first terminal, the second relay address request message requesting the second relay address designated for relaying the real-time traffic from the second terminal to the first terminal, the second relay address being provided in response to the second relay address request message.

17. The method of claim 16, further comprising:

relaying real-time traffic transmitted in the second communication channel from the second terminal to the first terminal through the second relay address, wherein the real-time traffic transmitted in at least one of the second communication channel or third communication channel comprises at least one of an audio stream or a video stream.

18. The method of claim 13, further comprising:

relaying the control signals transmitted in the first communication channel between the first terminal and the second terminal trough the first relay address, wherein the control signals comprise at least one of a request message or a response message.

19. The method of claim 13, closing the second communication channel includes closing the second communication channel in response to an indication of establishment of a third communication channel between the first terminal and the second terminal in an instance in which the second terminal is identified to be in the same private network as the first terminal by verification of transmission of connectivity check packets therebetween.

20. The method of claim 13, wherein when the second terminal is identified to be in the public network by transmission of a trigger packet from the first terminal to the second terminal, establishing the third communication channel includes transmission of a trigger packet to the second terminal, the trigger packet being configured to trigger a second binding address at the interface of the private network for establishing the third communication channel between the first terminal and the second terminal.

21. A method of providing a communication channel between an apparatus in a private network and a second apparatus, the method comprising:

sending a first relay address request message to an intermediate system, the first relay address request message being sent through a first binding address at an interface of the private network, the first relay address request message requesting that the intermediate system provide a first relay address designated for the apparatus;

receiving in response to the first relay address request message, the first relay address for establishing a first communication channel between the apparatus and a second apparatus through the intermediate system;

receiving control signals from the second apparatus, through the first relay address and in the first communication channel such that the intermediate system relays the control signals between the apparatus and the second apparatus;

establishing a second communication channel between the apparatus and the second apparatus, and independent of the intermediate system; and transmitting real-time traffic to the second apparatus, and receiving real-time traffic from the second apparatus, in the second communication channel such that the intermediate system does not relay the real-time traffic between the apparatus and the second apparatus.

22. The method of claim 21, further comprising:

receiving a second relay address designated for the apparatus to establish another communication channel between the apparatus and the second apparatus through the intermediate system before the second communication channel is established; and receiving the real-time traffic from the second apparatus, in the other communication channel such that the intermediate system relays the real-time traffic from the second apparatus to the apparatus.

23. The method of claim 22, further comprising:

establishing the second communication channel after establishment of the other communication channel; and sending an indication of establishment of the second communication channel to direct the intermediate system to close the other communication channel.

24. The method of claim 21, further comprising:

establishing the second communication channel includes transmission of a trigger packet to the second apparatus, the trigger packet being configured to trigger a second binding address at the interface for establishing the second communication channel between the apparatus and the second apparatus.

25. The method of claim 21, further comprising:

establishing the second communication channel includes transmission of at least two connectivity check packets between the apparatus and the second apparatus to enable a direct communication therebetween.

\* \* \* \* \*